US007893388B2

(12) United States Patent
Barnes (10) Patent No.: US 7,893,388 B2
(45) Date of Patent: Feb. 22, 2011

(54) MICROWAVE GRILL (76) Inventor: Neal P. Barnes, 204 Cherry Hill Trail, Medina, MN (US) 55340

( * ) Notice: Subject to any disclaimer, the term of this patent is extended or adjusted under 35 U.S.C. 154(b) by 114 days.

(21) Appl. No.: 11/972,027

(22) Filed: Jan. 10, 2008

(65) Prior Publication Data
US 2008/0217328 A1 Sep. 11, 2008

Related U.S. Application Data (60) Provisional application No. 60/884,797, filed on Jan. 12, 2007.

(51) Int. Cl.
H05B 6/80 (2006.01)
(52) U.S. Cl. .................. 219/725; 219/730; 219/732
(58) Field of Classification Search .............. 219/730, 219/731, 725, 732, 385, 386, 524, 533, 535, 219/404; 426/241, 243; 99/372, 349, 379, 99/444, 341, 375, 391, 377
See application file for complete search history.

(56) References Cited

U.S. PATENT DOCUMENTS

| 4,413,167 | A | * | 11/1983 | Martel et al. ............... 219/729 |
| 4,748,308 | A | * | 5/1988 | Drews ...................... 219/730 |
| 5,701,804 | A | | 12/1997 | Liebermann |
| 5,736,718 | A | * | 4/1998 | Levinson .................... 219/729 |
| 6,016,741 | A | * | 1/2000 | Tsai et al. ................... 99/341 |
| 6,530,308 | B1 | * | 3/2003 | Lin ........................... 99/330 |
| 6,608,292 | B1 | | 8/2003 | Barnes |
| 6,737,164 | B2 | | 5/2004 | Araki et al. |
| 2007/0029316 | A1 | * | 2/2007 | Fernandez ................. 219/730 |

OTHER PUBLICATIONS

PCT International Search Report, dated Jun. 27, 2008, 3 pages.

* cited by examiner

Primary Examiner—Tu B Hoang
Assistant Examiner—Hung Nguyen
(74) Attorney, Agent, or Firm—Pauly, Devrig Smith & Deffner, L.L.C.

(57) ABSTRACT

A microwave grill for converting microwave energy to heat and applying the heat to a grillable food or other grillable substance. The microwave grill a cover and a base that each have a grill element and an enclosure. The grill element includes a microwave absorbent material and a grilling surface that are in thermal communication with each other. The enclosure is attached to the grill element. The enclosure is fabricated from a microwave transparent material possessing a low heat transfer rate. The first enclosure substantially extends over the first microwave absorbent material. A hinge mechanism operably attaches the cover and the base. An offset bump extends from at least one of the enclosures to maintain the cover and the base in a first spaced-apart configuration when the cover and the base are in a closed configuration.

6 Claims, 9 Drawing Sheets

FIG. 16

MICROWAVE GRILL

CROSS REFERENCE TO RELATED APPLICATION

This application claims priority from U.S. Provisional patent application Ser. No. 60/884,797 which was filed on Jan. 12, 2007, and which is hereby incorporated by reference.

FIELD OF THE INVENTION

The invention in general relates to appliances that operate by changing microwave energy to heat energy and conducting the heat to food by contact, and more particularly to such appliances that can be used to grill foods.

BACKGROUND OF THE INVENTION

Appliances that heat grillable food or other grillable substances by causing microwave energy to be absorbed by an intermediate body, such as a block of ferrite, which in turn transfers heat to the grillable food, which we shall refer to herein as microwave grills, have been known for more than twenty years.

These appliances inherently require no ventilation of burned fuels and thus can be used in a small kitchen, use a ready source of energy, and are very fast as compared to conventional grills. Yet a commercially successful microwave grill has never been produced. The reason is that prior art microwave grills have never reached the degree of reliability and ease of use expected for kitchen appliances, particularly in the upscale homes and businesses that would tend to use such grills.

Freedman et al., U.S. Pat. No. 4,362,917, describe a block of ferrite binded to a microwave transparent cover. Teich et al., U.S. Pat. No. 4,454,403, describes a silicone material having ferrite material dispersed within the silicone binded to a microwave transparent cover. The ferrite material in these references continuously contacts the microwave transparent cover and transfers heat across the whole of the microwave transparent cover making the microwave transparent cover uncomfortable to the touch of a user. In addition, these designs do not include a suitable means for handling grease and other liquids that are generated in the grilling process.

Levinson, U.S. Pat. No. 5,736,718, describes a vertical microwave grilling apparatus with a separate collection container. This arrangement requires alignment between the grilling apparatus and the collection container and is really too messy to appeal to the average upscale griller.

Barnes, U.S. Pat. No. 6,608,292, discloses a microwave grill having a cover that is pivotally mounted to the base. The cover and base each include a grill element. After preheating, food is placed between the grill elements and the microwave grill is placed in a microwave oven to cook the food.

SUMMARY OF THE INVENTION

The invention relates to an enhanced microwave grill that provides increased functionality to prior microwave grills such as is disclosed in Barnes, U.S. Pat. No. 6,608,292.

DETAILED DESCRIPTION OF THE PREFERRED EMBODIMENTS

A microwave grill according to an embodiment of the present invention is illustrated at 10 in the Figures. The microwave grill 10 enables foods to be prepared with a similar flavor and appearance that is obtained through cooking on a conventional outdoor grill.

The microwave grill requires no electricity by itself to operate. Rather, the microwave grill 10 is used in conjunction with a microwave oven (not shown). The microwave grill is preferably dishwasher safe, meaning that the microwave grill may be washed in a dishwasher without degrading or damaging the components thereof.

Figure 1:
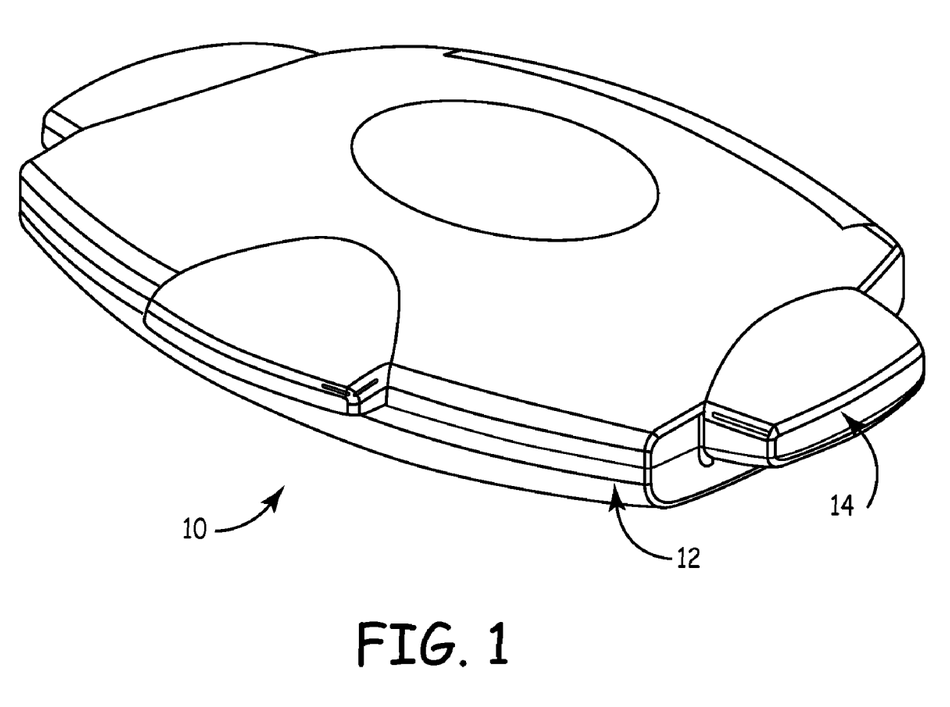
FIG. 1 is a perspective view of a microwave grill according to an embodiment of the invention where the microwave grill is in a closed configuration.
Figure 3:
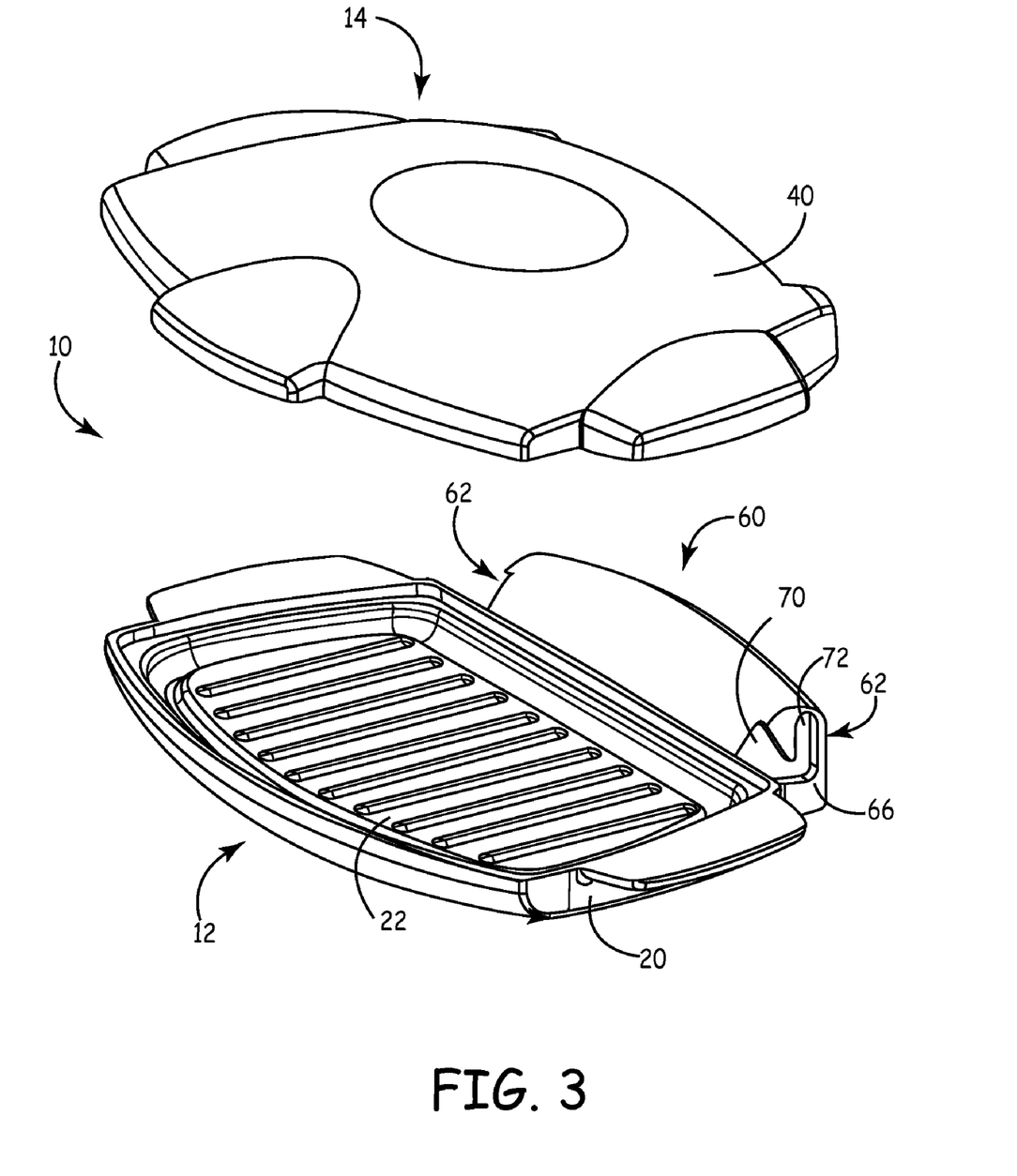
FIG. 3 is a perspective view of a base and cover of the microwave grill in a separate position.
Figure 4:
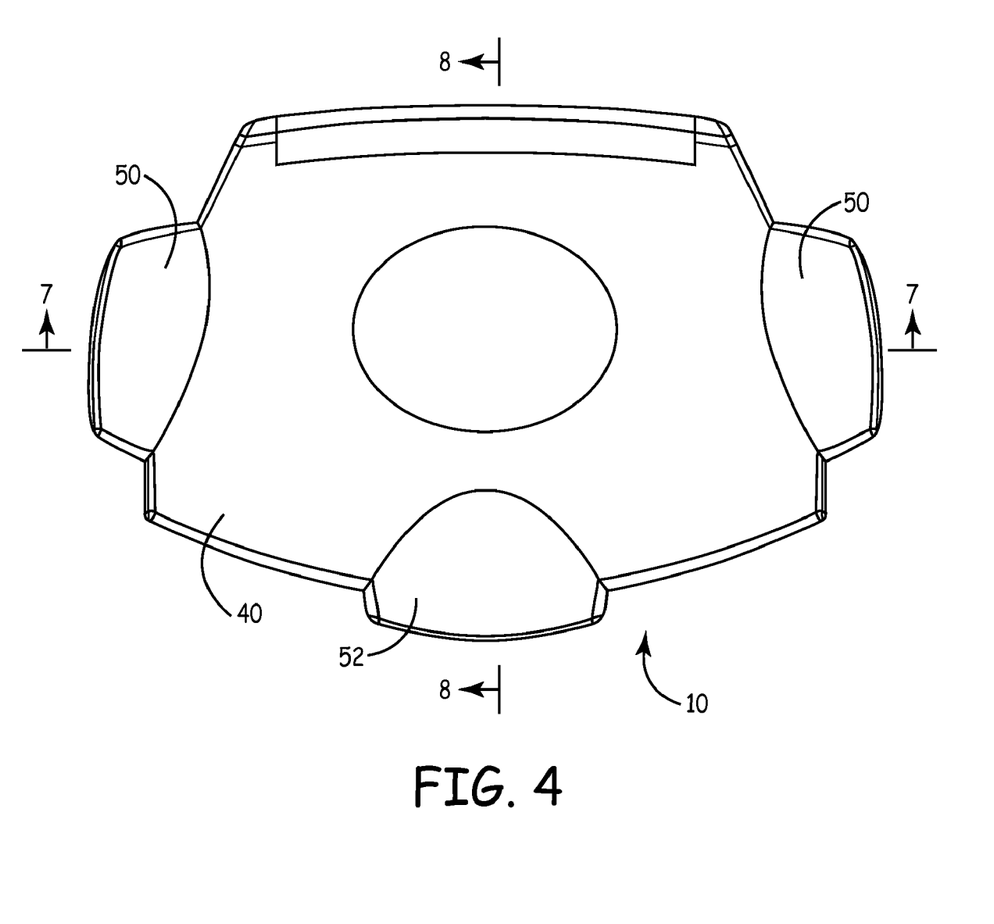
FIG. 4 is a top view of the microwave grill.
Figure 5:
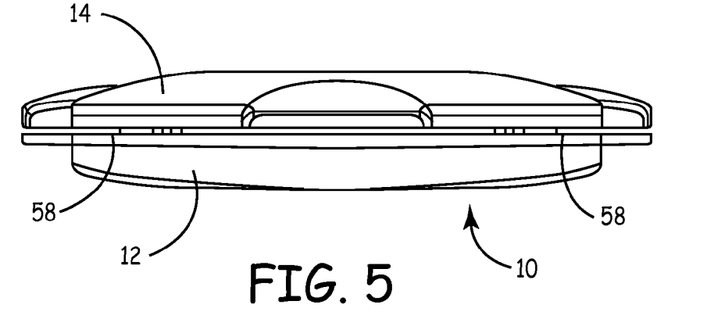
FIG. 5 is front view of the microwave grill.
Figure 6:
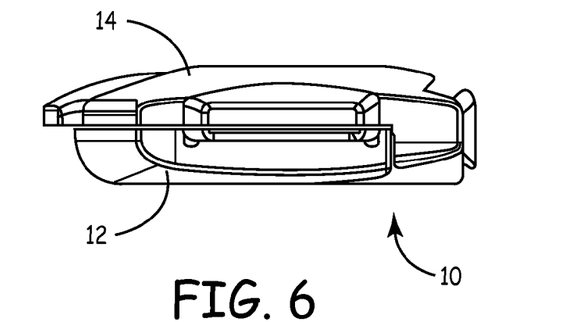
FIG. 6 is a side view of the microwave grill.

The microwave grill 10 generally includes a base 12 and a cover 14 that are pivotally mounted with respect to each other to provide a clam-shell configuration. This configuration permits the cover 14 to be positioned adjacent the base 12 (as illustrated in FIG. 1) for cooking and then pivoted apart from each other (as illustrated in FIG. 3) for placing foods onto and removing foods from the microwave grill.

Figure 2:
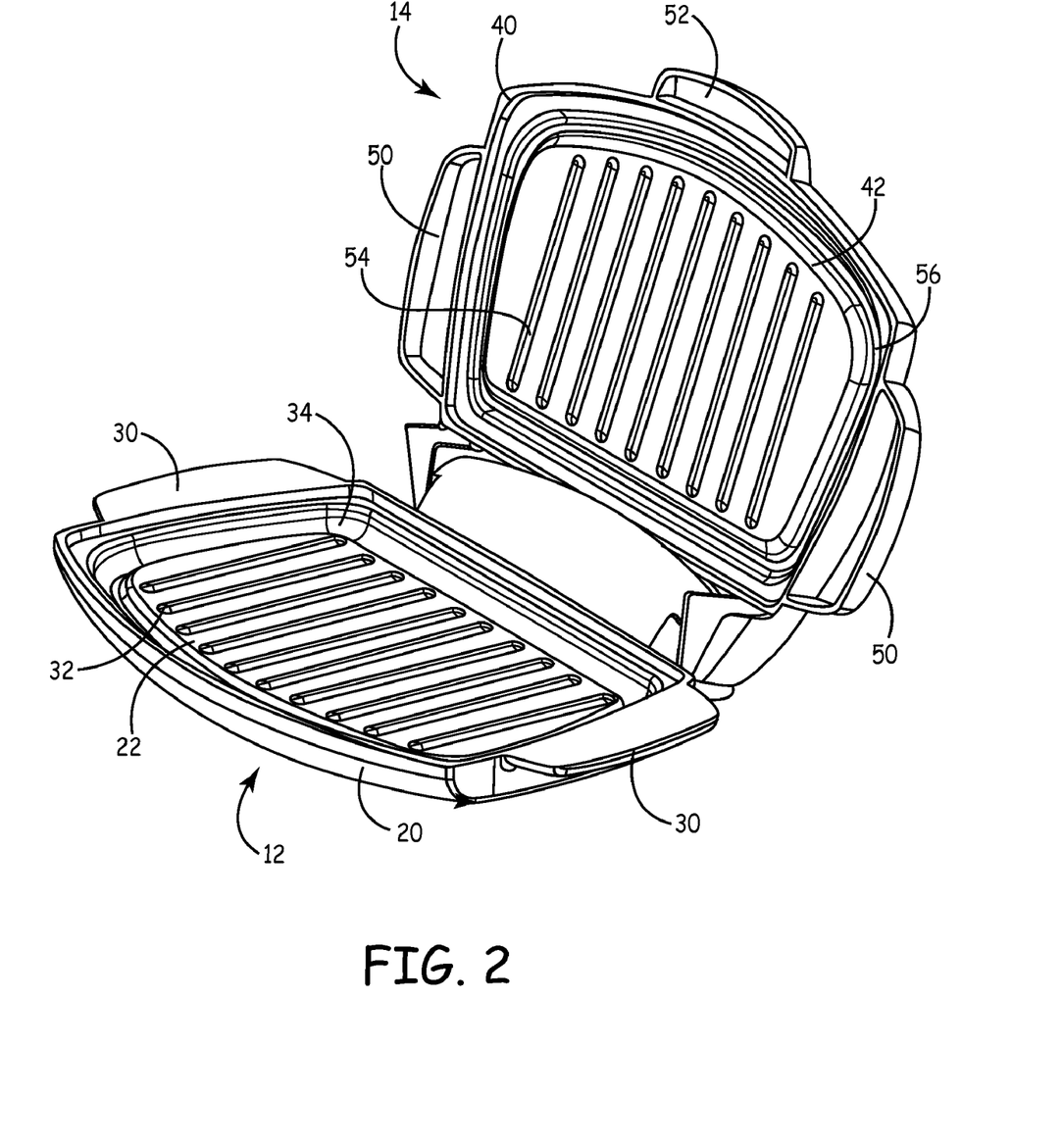
FIG. 2 is a perspective view of the microwave grill in an opened configuration.

The base 12 generally includes a base enclosure 20 and a base grill element 22, as most clearly illustrated in FIG. 2. The base enclosure 20 is preferably formed with base side handles 30.

The base side handles 30 may be formed from the same material as the rest of the base enclosure 20. Alternatively, the base side handles 30 may be formed from a material that is different than the other portions of the base enclosure 20. In this configuration, the base side handles 30 may be formed from a material having a heat transfer rate that is lower than the heat transfer rate of the other portions of the base enclosure 20. This configuration further reduces the temperature of the side handles 30 to thereby enable the microwave grill 10 to be used without protecting the user's hands.

The base grill element 22 absorbs microwave energy and converts the microwave energy into thermal energy to cook the food that is placed on the base grill element 22. The base grill element 22 may have a variety of configurations such as being substantially flat or having a plurality of ribs 32 formed thereon. The ribs 32 not only provide a searing effect that is similar to conventional grilling but also assist in draining liquids that are released from the food during cooking. Alternatively, the base grill element 22 may have a substantially flat surface.

Figure 7:
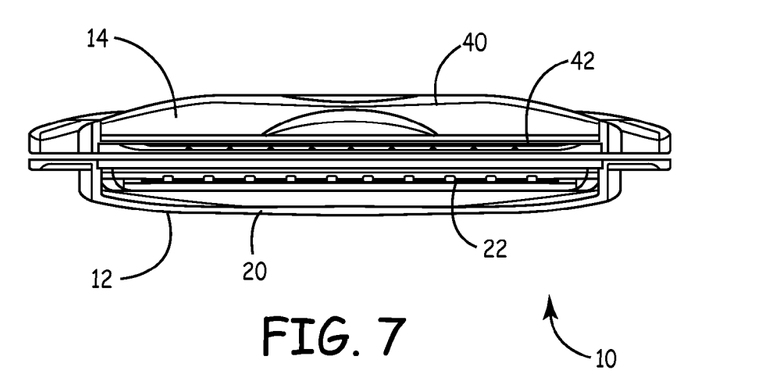
FIG. 7 is a sectional view of the microwave grill taken along a line 7-7 in FIG. 4.
Figure 8:
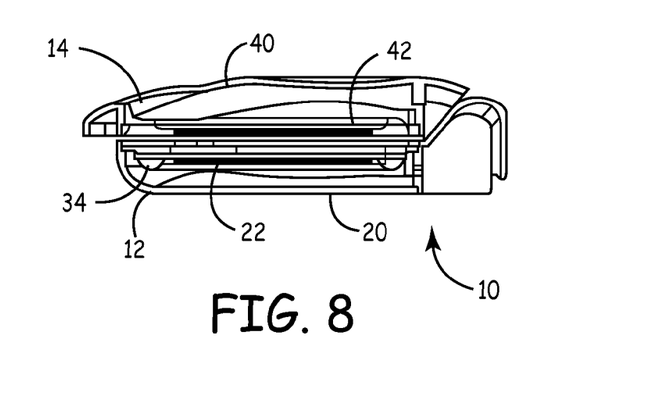
FIG. 8 is a sectional view of the microwave grill taken along a line 8-8 in FIG. 4.

The base grill element 22 preferably has a convex configuration such that a center area of the base grill element 22 is above an edge of the base grill element 22, as most clearly illustrated in FIGS. 7 and 8. Forming the base grill element 22 with the convex configuration assists in draining liquids that are released from the food during the cooking process.

The base grill element 22 may be fabricated from a variety of materials. One suitable material for fabricating the base grill element 22 is stamped aluminum. To reduce the potential of food sticking to the base grill element 22, an outer surface of the base grill element 22 may be covered by a non-stick coating such as TEFLON. It is also possible to fabricate the base grill element 22 from anodized aluminum.

The base grill element 22 includes a microwave absorbent material on a back surface thereof. The microwave absorbent material may be ferrite or non-ferrite based. The microwave absorbent material may include a ferrite mixture of resin and a metal oxide. A few suitable materials for use in the ferrite mixture are XYLOP and Powder Tech FP350.

The base enclosure 20 may be fabricated from a microwave transparent material that does not absorb or reflect microwave energy during the cooking process. The material used for fabricating the base enclosure 20 also preferably possesses good insulating characteristics so that the base enclosure 20 resists heating when the microwave grill 10 is placed in a microwave oven.

This characteristic thereby enables the microwave grill 10 to be lifted by a person without the use of an oven mitt or other protective device. One suitable material for fabricating the base enclosure 20 is a bulk molding compound with low microwave absorption rates.

A base trough 34 may be located around the perimeter of the base grill element 22 to capture liquids that are released from the food during cooking. The width and depth of the base trough 34 are selected so that the base trough 34 has sufficient size to collect the liquids that are released so that the released liquids do not remain on the base grill element 22. In one configuration, the base trough 34 has a capacity of about 50 milliliters.

The base enclosure 20 preferably has a recess formed therein that is adapted to receive the base grill element 22. The base grill element 22 is disposed in and supported by the base enclosure 20. To reduce the heat transfer between the base enclosure 20 and the base grill element 22, a void space is provided between the base enclosure 20 and the base grill element 22.

The base 12 may include a base water-tight seal that is located around the perimeter of the base grill element 22 to prevent liquids from going between the base enclosure 20 and the base grill element 22 not only during cooking but also during cleaning such as in a dishwasher. The base water-tight seal may be formed from a friction fit between the base enclosure 20 and the base grill element 22. Alternatively, the base water-tight seal may be formed from a heat resistant adhesive material, such as epoxy glue. It is also possible to configure the base grill element 22 so that it can be removed from the base enclosure 20 for cleaning.

The cover 14 generally includes a cover enclosure 40 and a cover grill element 42. The cover enclosure 40 is preferably formed with cover side handles 50. The cover enclosure 40 may also include a cover front handle 52.

The cover side handles 50 and the cover front handle 52 may be formed from the same material as the rest of the cover enclosure 40. Alternatively, the cover side handles 50 and the cover front handle 52 may be formed from a material that is different than the other portions of the cover enclosure 40. In this configuration, the cover side handles 50 and the cover front handle 52 may be formed from a material having a heat transfer rate that is lower than the heat transfer rate of the other portions of the cover enclosure 40.

The cover grill element 42 absorbs microwave energy and converts the microwave energy into thermal energy to cook the food that is placed on the cover grill element 42. The cover grill element 42 may have a variety of configurations such as being substantially flat or having a plurality of ribs 54 formed thereon. The ribs 54 not only provide a searing effect that is similar to conventional grilling but also assist in draining liquids that are released from the food during cooking. Alternatively, the cover grill element 42 may have a substantially flat surface.

The cover grill element 42 may be fabricated from a variety of material. One suitable material for fabricating the cover grill element 42 is stamped aluminum. To reduce the potential of food sticking to the cover grill element 42, an outer surface of the cover grill element 42 may be covered by a non-stick coating such as TEFLON. It is also possible to fabricate the cover grill element 42 from anodized aluminum.

The cover grill element 42 includes a microwave absorbent material on a back surface thereof. The microwave absorbent material may be ferrite or non-ferrite based. The microwave absorbent material may include a ferrite mixture of resin and a metal oxide. Suitable materials for use in the ferrite mixture are XYLOP and Powder Tech FP350.

The cover enclosure 40 may be fabricated from a microwave transparent material that does not absorb or reflect microwave energy during the cooking process. The material used for fabricating the cover enclosure 40 also preferably possesses good insulating characteristics so that the cover enclosure 40 resists heating when the microwave grill 10 is placed in a microwave oven. This characteristic thereby enables a person to touch the outer surface of the cover enclosure 40 without injury. One suitable material for fabricating the cover enclosure 40 is a bulk molding compound with low microwave absorption rates.

The cover enclosure 40 preferably has a recess formed therein that is adapted to receive the cover grill element 42. The cover grill element 42 is disposed in and supported by the cover enclosure 40. To reduce the heat transfer between the cover enclosure 40 and the cover grill element 42, a void space is provided between the cover enclosure 40 and the cover grill element 42.

The cover 14 may include a cover water-tight seal that is located around the perimeter of the cover grill element 42 to prevent liquids from going between the cover enclosure 40 and the cover grill element 42 not only during cooking but also during cleaning such as in a dishwasher. The cover water-tight seal may be formed from a friction fit between the cover enclosure 40 and the cover grill element 42. Alternatively, the cover water-tight seal may be formed from a heat resistant adhesive material such as epoxy glue. It is also possible to configure the cover grill element 42 so that it can be removed from the cover enclosure 40 for cleaning.

A cover trough 56 may be located around the perimeter of the cover grill element 22 to capture liquids that are released from the food during cooking when the microwave grill 10 is used with the cover 14 in the open position. The width and depth of the cover trough 56 are selected so that the cover trough 56 has sufficient size to collect the liquids that are released so that the released liquids do not remain on the base grill element 22. In many configurations, the cover trough 56 has a capacity of about 50 milliliters.

At least one of the base enclosure 20 and the cover enclosure 40 includes at least one offset bumps 58 on a surface thereof. The offset bumps 58 maintain the upper surface of the base enclosure 20 a slight distance away from the lower surface of the cover enclosure 40 when the microwave grill 10 is closed. In one configuration, the offset bumps 58 have a thickness of less than 10 millimeters and preferably about 2 millimeters. The offset bumps 58 thereby reduce the potential of arcing between the base grill element 22 and the cover grill element 42.

The microwave grill 10 may include a hinge assembly 60 for interconnecting the base 12 and the cover 14. The hinge assembly 60 preferably includes a pair of hinge mechanisms 62 that may be placed along a back edge of the microwave grill 10.

Each of the hinge mechanisms 62 may include a pin extending from the cover enclosure 40 and a slot formed in the base enclosure 20. In a first configuration, which is illustrated in FIG. 3, the slot has a V-shaped configuration with a first leg 70 being closed and a second leg 72 being open.

Using this configuration for the hinge mechanisms 62 enables the pins 64 and the slots 66 to be molded into the cover enclosure 40 and the base enclosure 42, respectively, to which the component is associated. The hinge mechanism thereby is durable and allows the cover 14 to be positioned in a variety of orientations with respect to the base 12 as well as separated from the base 12.

The hinge mechanisms 62 also enable a spacing between the base 12 and the cover 14 to be adjusted depending on the thickness of the food being cooked so that both the base 12 and the cover 14 remain substantially aligned with the upper and lower surfaces of the food during cooking to enhance the efficiency of the cooking process.

Figure 9:
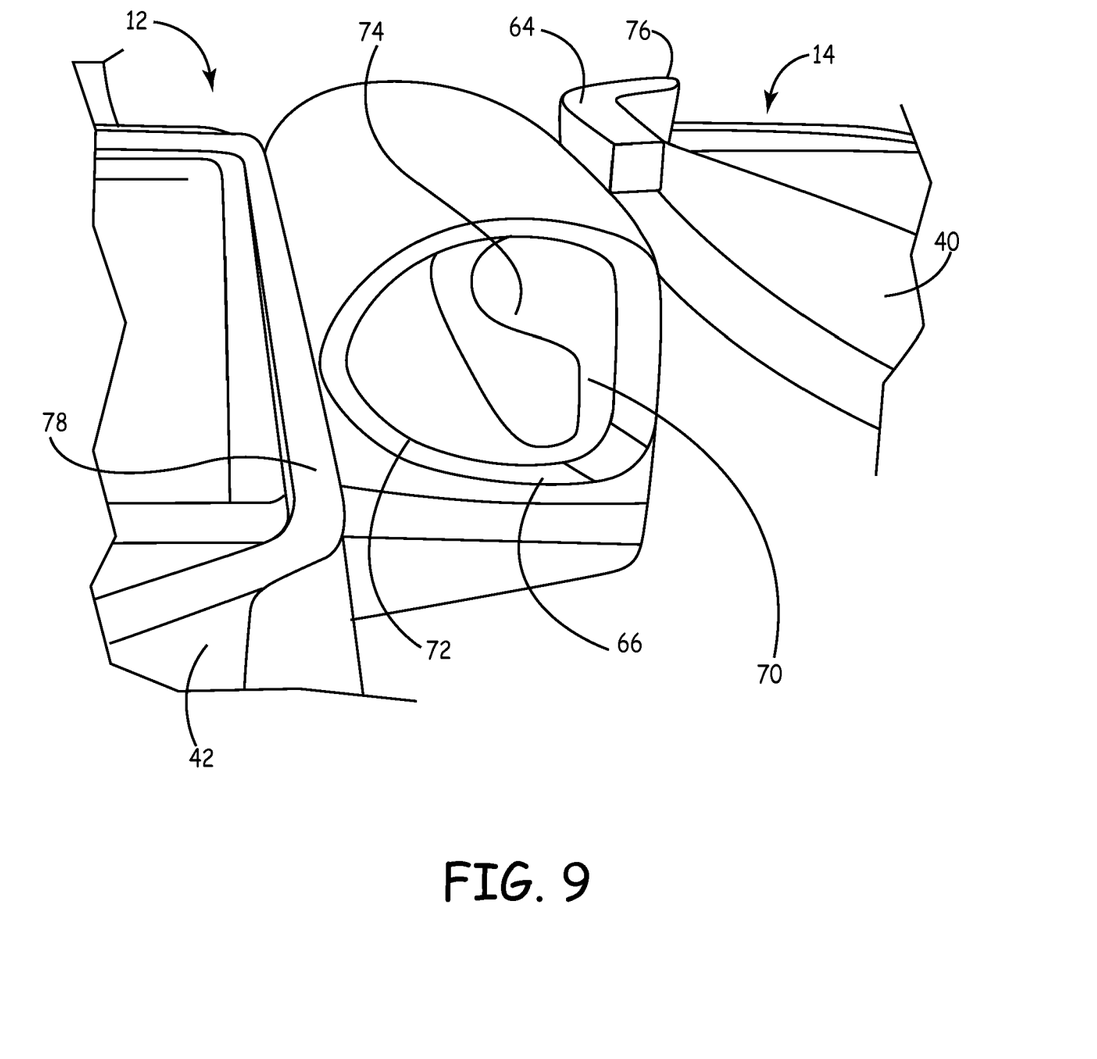
FIG. 9 is a side view of an alternative configuration of a hinge mechanism for the microwave grill.

Alternatively, the slot 66 may include a third leg 74 that extends from the enclosed end of the first leg 70 towards the open end of the second leg 72. The alternative slot configuration enables the cover 14 to slide forward with respect to the base 12. When the cover 14 slides forward with respect to the base 12, a ledge portion 76 adjacent the pin 64 on the cover enclosure 40 engages a lip 78 on the base enclosure 20 and thereby maintains the cover 14 in a spaced-apart configuration with respect to the base 12 when closed. This configuration thereby enable items that expand while cooking such as breads to have enhanced cooking results.

Figure 10:
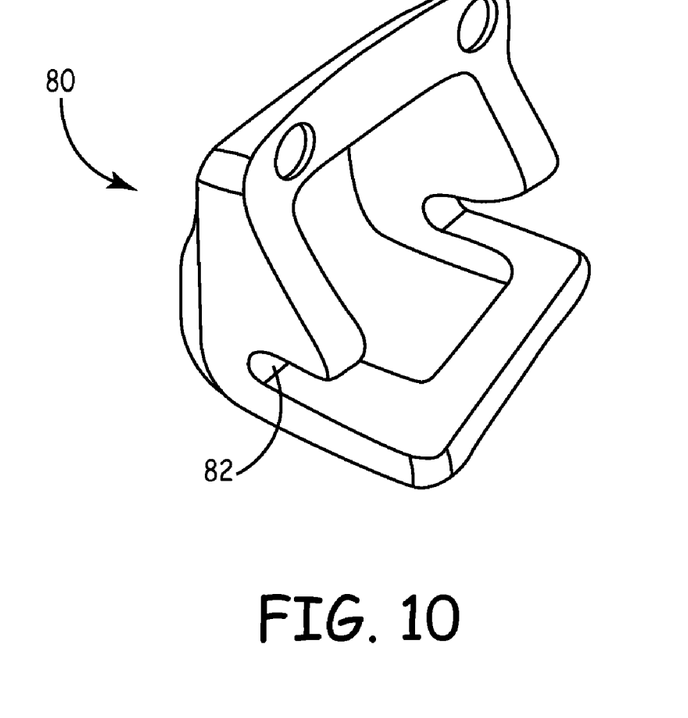
FIG. 10 is a front perspective view of a grill spacer for use with the microwave grill.
Figure 11:
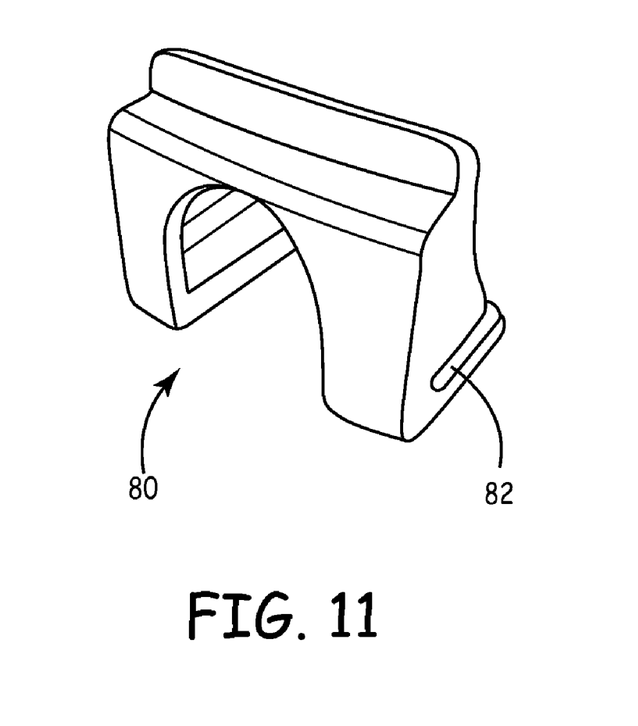
FIG. 11 is a back perspective view of the grill spacer.

Another aspect of the invention relates to using grill spacers 80, such as are illustrated in FIGS. 10 and 11, to maintained the cover 14 in a generally parallel but spaced-apart relationship from the base 12. The grill spacers 80 have a channel 82 formed therein. The channel 82 is adapted to receive at least a portion of the base side handle 30. The cover side handle 50 rests on an upper surface of the grill spacer 80. The height of the grill spacer 80 thereby determines the spacing between the cover 14 and the base 12.

While not illustrated, the grill spacer 80 may include at least two stepped regions. Varying the insertion of the base side handle 30 into the channel 82 thereby enables the cover side handle 50 to selectively engage one of the stepped regions to thereby provide adjustable spacing between the cover 14 and the base 12.

Figure 12:
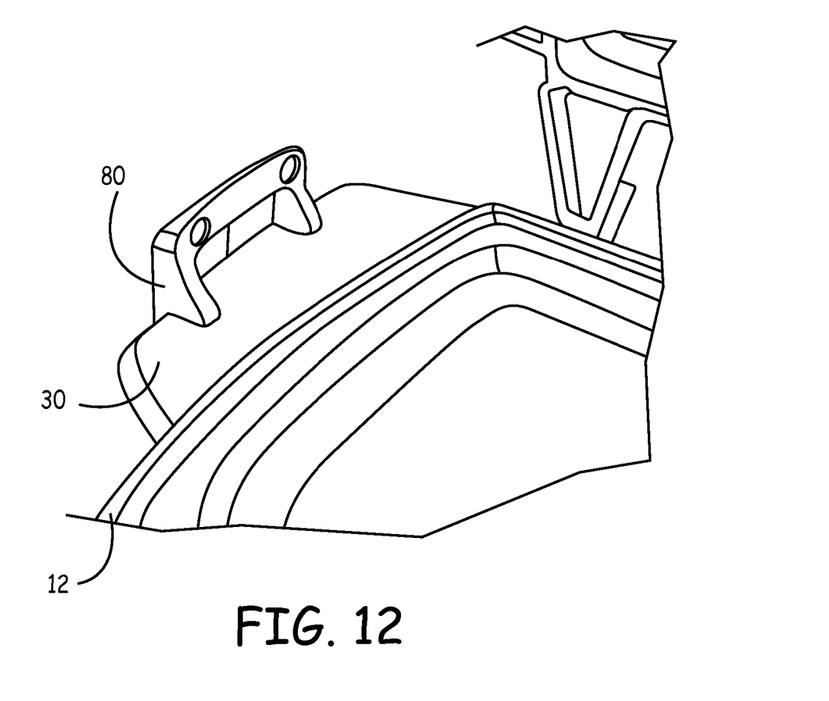
FIG. 12 is a perspective view of the grill spacer attached to a base handle on the microwave grill.
Figure 13:
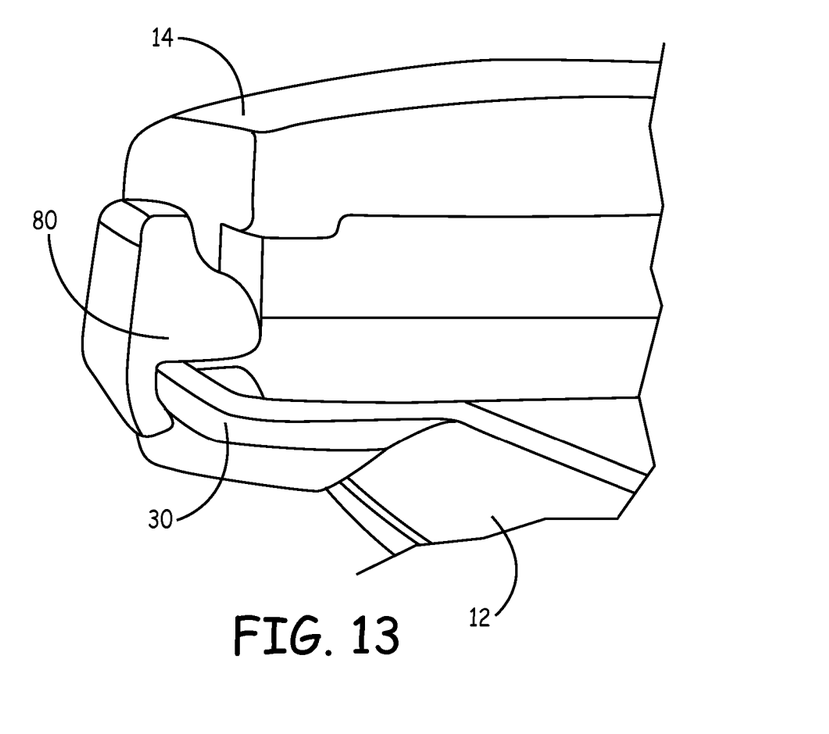
FIG. 13 is a side view of the grill spacer attached to the handle on the microwave grill.

One of the grill spacers 80 may be attached to the base side handles 30 on opposite sides of the base enclosure 20, as illustrated in FIGS. 12-13. As illustrated, the base side handle 30 is positioned in the channel 82 (FIG. 12) and then the cover 14 is closed until the cover side handle 50 rests on the upper edge of the grill spacer 80 (FIG. 13).

Figure 14:
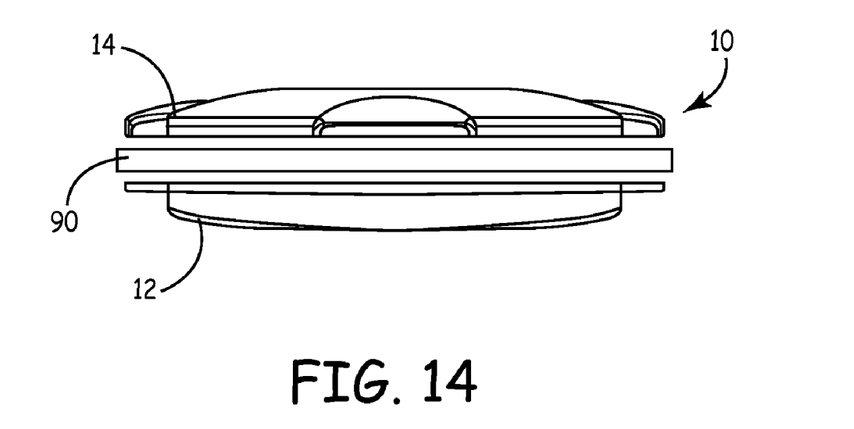
FIG. 14 is a front view of another embodiment where the microwave grill has three grill elements.

In another configuration, the microwave grill 10 includes at least one additional grill element 90 such that there would be at least three grill elements in an at least partially overlapping configuration, as illustrated in FIG. 14. The additional grill element may be positioned below the base 12 or above the cover 14. Similar to the other grill elements, the additional grill element would have an enclosure extending over at least a portion of the additional grill element to facilitate moving the additional grill element.

Figure 15:
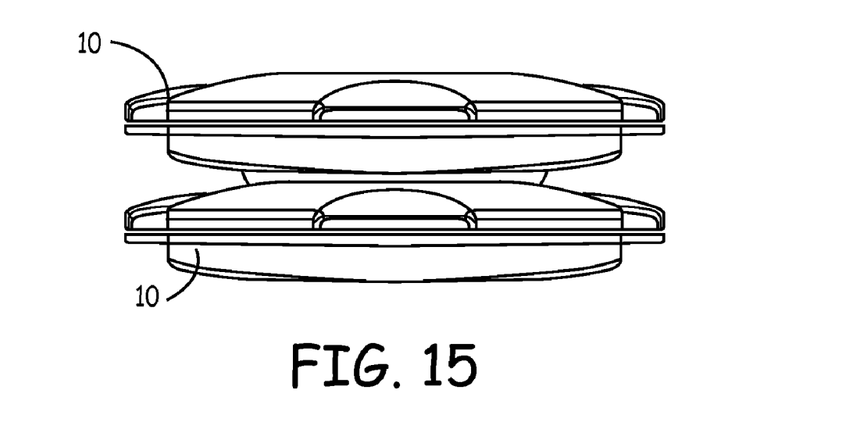
FIG. 15 is a front view of another embodiment where two microwave grills are stacked upon each other.

In yet another configuration, multiple microwave grills 10 are adapted for stacking, as illustrated in FIG. 15. When stacking multiple microwave grills 10, a lower surface of the base 12 sits on an upper surface of the cover 14. The configurations of these components reduces the potential of the microwave grills 10 moving with respect to each other.

Figure 16:
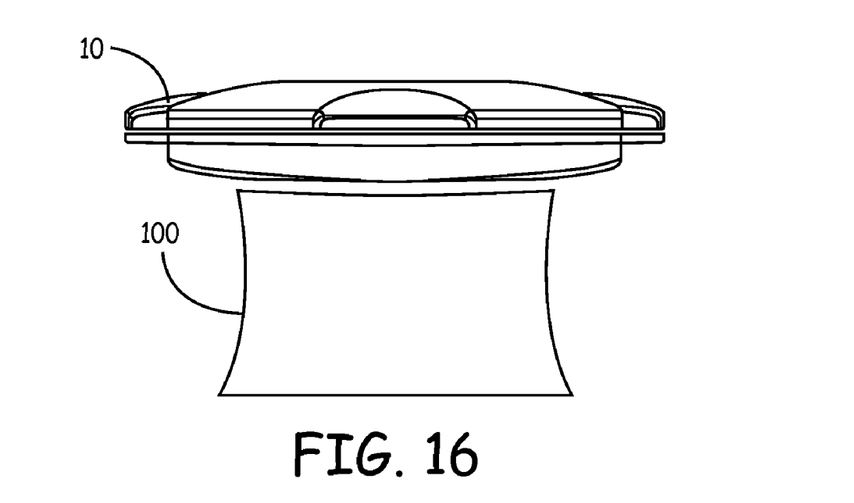
FIG. 16 is a front view of another embodiment where a stand is used in conjunction with the microwave grill.

In another configuration that is illustrated in FIG. 16, a support 100 is placed beneath the microwave grill 10 to raise the microwave grill 10 above a lower surface of the microwave over. The support 100 mates with the lower surface of the microwave grill 10 and resists unintended movement of the components with respect to each other such as when heating in a microwave over.

In operation, the microwave grill 10 is preheated in a microwave oven (not shown). The cover 14 is opened and food is placed on the base grill element 22. The cover 14 is then closed and the microwave grill 10 is heated in the microwave to thereby cook the food. Food cooked in the microwave grill 10 has a flavor and appearance that are similar to food cooked on conventional grills. The microwave grill 10 is suitable for use with a wide range of foods such as steaks, hamburgers, bacon, poultry, fish, grilled sandwiches and breads. It is also possible to cook with the microwave grill 10 using the cover 14 in an open position where the cover 14 is generally parallel to the base 12.

Alternatively, the microwave grill 10 may be preheated in a microwave oven (not shown) and then residual heat is used for cooking food. In this method, the cover 14 is opened and food is placed on the base grill element 22. The cover 14 is then close and the food is allowed to cook in the microwave grill 10. This method is particularly useful for cooking food like shrimp.

It is contemplated that features disclosed in this application, as well as those described in the above applications incorporated by reference, can be mixed and matched to suit particular circumstances. Various other modifications and changes will be apparent to those of ordinary skill.

The invention claimed is:

1. A microwave grill for converting microwave energy to heat and applying the heat to a grillable food or other grillable substance, wherein the microwave grill has an open, a fully closed position and a spaced-apart configuration, wherein the microwave grill comprises:

a first grill element comprising a first microwave absorbent material and a first grilling surface that are in thermal communication with each other, wherein the first grill element has a first hinge pin extending therethrough;

a second grill element comprising a second microwave absorbent material and a second grilling surface that are in thermal communication with each other, wherein the second grill element has a first hinge slot formed that is adapted to receive the first hinge pin, wherein the first hinge slot has a first, a second and a third leg, wherein the first leg and second leg are in communication with each other, and the first and third leg are in communication with each other, wherein an end of the first leg opposite the second leg is open, and the first leg and the second leg are oriented at an angle with respect to each other, and wherein the third leg extends from the first leg towards the open end of the second leg and is oriented at an angle with respect to the first leg such that the third leg enables the first grill element to slide forward with respect to the second grill element such that the first grill element and the second grill element remain substantially in a spaced apart configuration.

2. The microwave grill of claim 1, wherein the first grill element has a ledge portion, wherein the second grill element has a lip, wherein the ledge portion engages the lip to retain the first grill element in a spaced-apart configuration with respect to the second grill element when the first hinge pin is positioned in the third leg.

3. The microwave grill of claim 1, further comprising
a third grill element positionable between the first grill element and the second grill element, wherein the third grill element comprises a third microwave absorbent material, a third grilling surface and a fourth grilling surface, wherein the third microwave absorbent material is in thermal communication with the third grilling surface and the fourth grilling surface; and
a hinge mechanism operably attaching the first grill element to the second grill element.

4. The microwave grill of claim 3, and further comprising at least one handle extending from at least one of the first enclosure and the second enclosure.

5. The microwave grill of claim 4, and further comprising a grill spacer that is removably attachable to the at least one handle to maintain the cover and the base in a second spaced-apart configuration when the cover and the base are in the closed configuration.

6. The microwave grill of claim 3, wherein the first microwave absorbent material and the second microwave absorbent material are each fabricated from a ferrite mixture of resin and metal oxide.

* * * * *